United States Patent [19]
Bowen

[11] Patent Number: 5,771,414
[45] Date of Patent: Jun. 23, 1998

[54] CAMERA HAVING A RECORDING DEVICE FOR RECORDING AN AUDIO MESSAGE ONTO A PHOTOGRAPHIC FRAME, AND PHOTOGRAPHIC FRAME HAVING A RECORDING STRIP

[76] Inventor: Paul T. Bowen, 8801 Clifford Ave., Chevy Chase, Md. 20815

[21] Appl. No.: 593,368

[22] Filed: Jan. 29, 1996

[51] Int. Cl.[6] .............................. G03B 17/24; G03B 17/50
[52] U.S. Cl. ............................ 396/312; 396/30; 396/320; 396/321
[58] Field of Search ................................ 354/83, 106, 76; 396/46, 30, 41, 310, 312, 319, 320, 321, 528, 300

[56] References Cited

U.S. PATENT DOCUMENTS

| | | | |
|---|---|---|---|
| 3,785,267 | 1/1974 | Asano | 95/89 L |
| 4,212,527 | 7/1980 | Fisher | 354/275 |
| 4,270,853 | 6/1981 | Hatada et al. | 354/76 |
| 4,905,029 | 2/1990 | Kelley | 354/76 |
| 4,983,996 | 1/1991 | Kinoshita | 354/76 |
| 5,128,700 | 7/1992 | Inoue et al. | 354/76 |
| 5,128,702 | 7/1992 | Ogawa et al. | 354/106 |
| 5,140,353 | 8/1992 | Stoneham | 354/105 |
| 5,272,498 | 12/1993 | Wakabayashi | 354/105 |
| 5,276,472 | 1/1994 | Bell et al. | 354/76 |
| 5,359,374 | 10/1994 | Schwartz | 354/76 |
| 5,365,303 | 11/1994 | Yamasaki et al. | 354/430 |
| 5,387,955 | 2/1995 | Cocca | 354/76 |
| 5,446,518 | 8/1995 | Kazumi | 354/412 |
| 5,479,228 | 12/1995 | Tamamura et al. | 354/106 |
| 5,489,955 | 2/1996 | Satoh et al. | 354/76 |
| 5,521,663 | 5/1996 | Norris, III | 354/106 |
| 5,530,501 | 6/1996 | Bell | 354/106 |
| 5,546,145 | 8/1996 | Bernardi et al. | 354/76 |
| 5,565,935 | 10/1996 | Miura et al. | 396/310 |
| 5,572,269 | 11/1996 | Brock et al. | 396/320 |

*Primary Examiner*—Safet Metjahic
*Assistant Examiner*—John Chizmar

[57] ABSTRACT

A camera includes a photographic film having an exposure region and an audio recording region for recording the audio signal directly onto the film. The audio recording region may be a recordable/readable magnetic recording region or a chip having an internal or external power supply, and the recording region can store predetermined recordings, or it can store live audio signals. The external power supply may be in the form of a reading device integrally or detachably formed in a photographic album. The magnetic recording region includes first and second magnetic recording strips perpendicular to one another wherein the first magnetic strip is recorded to prior to exiting of the selected film frame and the second magnetic strip is recorded to upon the exiting of the selected film frame.

17 Claims, 4 Drawing Sheets

CAMERA HAVING A RECORDING DEVICE FOR RECORDING AN AUDIO MESSAGE ONTO A PHOTOGRAPHIC FRAME, AND PHOTOGRAPHIC FRAME HAVING A RECORDING STRIP

BACKGROUND OF THE INVENTION

This invention relates to a camera for recording a message onto a photographic picture frame of the instantaneously or subsequently developing type. The invention also relates to a photographic picture frame capable of being instantaneously or subsequently developed, the photographic picture frame having an exposure region and a recording region (such as, for example, a strip or chip) for receiving an audio signal at the time of film exposure.

Photographic cameras and the film used in such cameras are somewhat one-dimensional in that there is no satisfactory technique for annotating a developed picture with descriptive information. Information relevant to such photographs is generally added in written form, or may be programmed during photography, which is time consuming. Furthermore, while cinematic technology, e.g., a camcorder, allows simultaneous audio and video recording, tape cassettes associated therewith contain storage capacity that is much more than is needed, and storage of the cassettes is also necessary. Furthermore, the film of a camcorder cannot be viewed without a playback device, which is particularly inconvenient for documentation used in files. For these reasons, photographers, for example, those associated with insurance companies and land surveyors, often take pictures, e.g., instant pictures, which are annotated to describe the situation shown in the photograph. Furthermore, photographers on vacation often find it difficult to remember where or what a particular photograph depicts. Thus, there is a need for an audio-visual recording medium capable of storing a short audio message alongside an associated photograph.

SUMMARY OF THE INVENTION

It is an object of the invention to obviate the shortcomings of currently available cameras and film.

It is another object of the invention to decrease storage requirements for archived audio-visual material.

It is another object of the invention to add an audio complement to photographic albums.

It is another object of the invention to obviate requirements for annotating photographs with written descriptions.

It is another object of the invention to provide an audio system for describing each photographic situation a photographer may encounter.

According to one aspect of the invention, there is provided a camera having a film exposure section including film frames structured to be developed after each of the film frames exits from the film exposure section, each of the film frames having an audio recording region, and a recording device for recording an audio signal onto the audio recording region of each of the film frames.

According to other aspects of the camera, the recording device may comprise a recording head that traverses each audio recording region just prior to or upon commencement of film exposure to record the audio signal on each of the film frames, and/or the recording device may comprise a memory buffer for temporarily storing the audio signal, and a recording device for transferring the audio signal to each of the film frames upon exiting from the film exposure section. The camera may further comprise an audio strip reader adapted to read the audio strip for selected playback, and the audio strip reader may be an electronic pen or scanner selectively detachable from the camera, or a separate element altogether.

According to another aspect of the invention, there is provided a photographic film capable of being developed upon commencement of an exposure operation triggered by a camera. The photographic film includes a frame having an exposure region and at least one audio recording region adjacent the exposure region, the audio recording region being adapted to record an audio signal.

According to other aspects of the film, the film may be transported along a first direction to exit the camera upon exposure, and the recording region may include a strip oriented in a second direction that is perpendicular to the first direction. Also, the film may be transported along a first direction to exit the camera upon exposure, and the recording strip may be oriented in a second direction that is parallel to the first direction, and the at least one recording strip may include first and second recording strips that are substantially perpendicular to one another. The film may be transported along a first direction to exit the camera upon exposure, and the first recording strip is parallel to the first direction and the second recording strip is perpendicular to the first direction. The film may further comprise an activation device adjacent the recording strip, wherein the audio signal can be reproduced upon activation of the activation device.

According to yet another aspect of the present invention, there is provided a system for recording and playing an audio signal of a photographic film capable of being developed following commencement of an exposure operation. The system includes at least one photographic frame having an exposure region and at least one audio recording region adjacent the exposure region, the audio recording region being adapted to receive an audio signal; a camera having a film exposure section containing the at least one photographic frame; a recording device for recording the audio signal onto the audio recording region of the film; and an audio playback device cooperable with the audio recording region of the frame.

According to other aspects of the system, the audio recording region may be an audio recording strip, the recording device may be mounted directly in the camera in facing relation to the audio recording strip, and the audio playback device may comprise an audio strip reader adapted to receive the audio recording strip for selected playback. Also, the audio strip reader may be an electronic pen capable of scanning the audio strip, or the audio strip reader may include a groove adapted to receive and scan the audio strip, either of which may be a separate element or selectively detachable from the camera. The audio recording region may include the recording device and the audio playback device may comprise an activation device integrally formed on the film. Also, the camera may include means for transferring a live audio signal to the recording device within the sleeve.

These and other aspects of the invention will be described in or apparent from the following detailed description of preferred embodiments.

BRIEF DESCRIPTION OF THE DRAWINGS

Preferred embodiments of the invention will be described with reference to the following drawings, wherein.

DETAILED DESCRIPTION OF PREFERRED EMBODIMENTS

Figure 1:
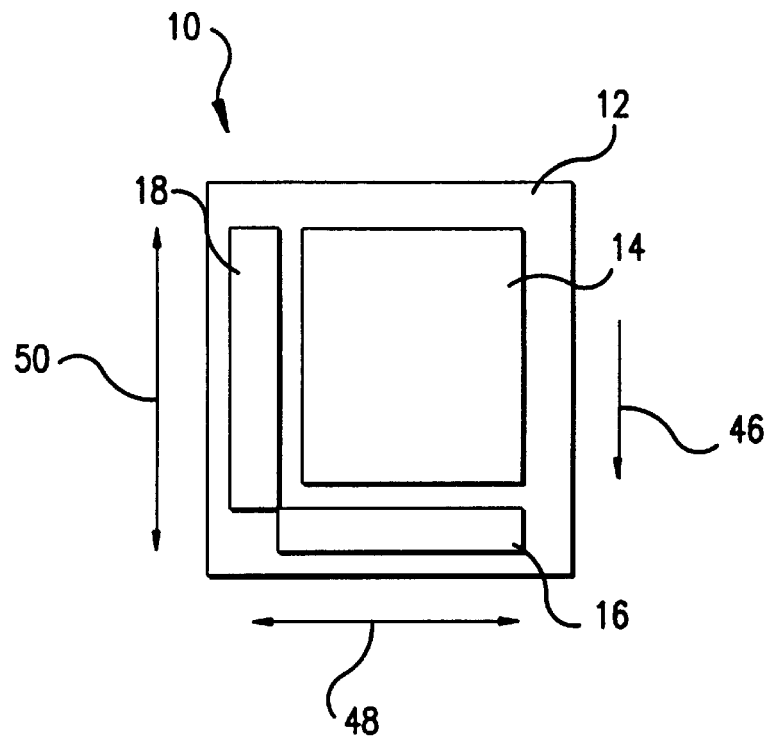
FIG. 1 illustrates a picture film according to a first embodiment of the present invention.
Figure 4:
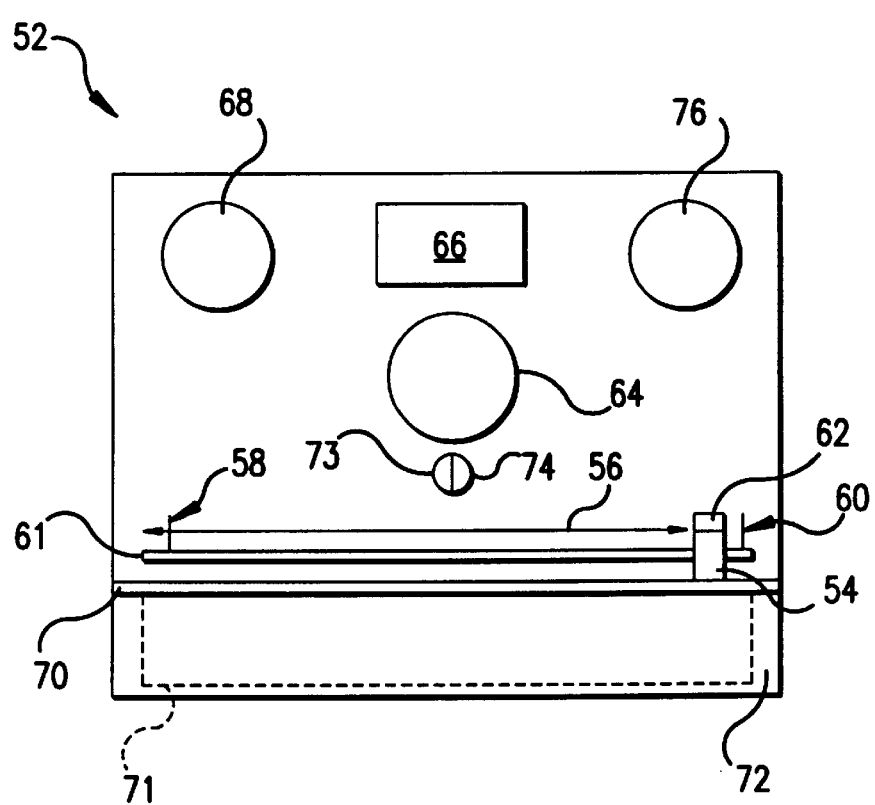
FIG. 4 illustrates a schematic view of a camera according to an embodiment of the present invention.

FIG. 1 illustrates a photographic film 10 of the type that is instantaneously developable upon commencement of an exposure operation of a camera 52 (FIG. 4). The film 10 includes a frame 12 having a photographic section 14 for recording a visual image, the exposure operation of which is conventional in the art. The frame 12 also includes at least one recording region 16, 18 for storing an audio signal just prior to and/or upon exiting of the frame 12 from the camera 52. The recording regions 16,18 may be optical, digital or magnetic recording strips that are adapted to cooperate with a recording device formed on a camera, as described below. The recording regions 16, 18 may also contain predetermined messages, for example, a sleeve 71 of a plurality of frames 12 may each include a different message according to a common theme of the occasion on which the pictures are to be taken, for example, a wedding, birthday party, or graduation. Whether the recording regions include predetermined or recorded live signals, they may be replayed by scanning the recording regions 16,18 with a scanner and channeling the recorded signal(s) to a sound emitting device, such as a speaker.

During live recording, the recording regions 16, 18 of the picture film 10 may be recorded onto in several fashions, using either one or both of the recording regions 16,18, or modifications thereof, and it is also possible to provide or use only one of the recording regions. For recording a live audio signal, the camera 52 includes a recording/reading head 54, as shown in FIG. 4, which can be stationary or translatable along a path 61, depending whether recording region 16 or 18, or both, is being used to record. Of course, the recording head 54 (magnetic, optical, digital) will match the type of recording strip and may be guided along an appropriate path along the margin of the film, and the path will naturally correspond to the shape of the recording strip, e.g., L-shaped and round strips are also within the scope of the present invention (see FIG. 5). Also, the recording head 54 may access each side of the frame 12, depending on the type of recording region 16, 18.

As shown in FIG. 4, the camera 52 includes an audio recording commencement button 76, and also includes conventional devices such as a lens 64, a flash 66, an exposure button 68, a slot 70 through which individual picture frames exit and a hinged gate 72 that covers an opening through which a sleeve or cassette 71 of film frames is inserted and withdrawn. The sleeve 71 may include an access opening (not shown) to the recording region if the live sound is to be recorded onto the selected strip before film exposure.

Also, the recording head 54 may be provided with a memory buffer 62 that temporarily stores audio signals, for example, when the horizontal recording section 16 has reached capacity, the memory buffer 62 stores the signal until the film 10 exits from the camera 52, whereupon the recording head 54 retrieves the signal from the memory buffer 62 and records the signal onto the vertical recording region 18. The camera 52 may also include a device 73, such as a microphone or a sound-to-electric signal converter, that communicates with and conveys live sound to the recording head 54 or buffer 62, and the path 61 may also provide an electrically conductive path for enabling communication between the recording head 54 and/or buffer 62 and microphone 73. The electrical connection between these elements could also be achieved using electric wires as well.

The recording head 54 may also perform a reading function so that a previously recorded audio signal from one of the audio recording regions 16, 18 can be replayed, for example, by re-exposing the selected audio strip to the reader through slot 70. Of course, the audio reader can be provided along side of the camera, or altogether separately from the camera, e.g., a grooved reader or an electronic pen is also within the scope of the present invention. In this event, the camera 52 could be provided with a sound producing device, such as a speaker 74 that communicates with the recording head 54 and/or buffer 62.

In one mode of operation, the picture film 10 is transported along a first direction 46 to exit the camera upon exposure, with the recording region 16 being oriented in a second direction 48 that is perpendicular to the first direction 46. The reading head 54 traverses along direction 56 and records onto the recording region 16 before commencement of the exposure operation.

In another mode of operation, the picture film 10 is transported along the first direction 46 to exit the camera upon exposure, and the recording region 18 is oriented in a second direction 50 that is parallel to the first direction 46, with the recording region 18 being recorded onto by the recording head 54 as the picture film 10 exits the camera. In this event, the recording head 54 may be mounted in a stationary fashion, and the sleeve 71 would not require an access opening for the recording head 54.

The film may also be transported along the first direction 46 to exit the camera upon exposure. The recording strip 18 is parallel to the first direction and the recording strip 16 is perpendicular to the first direction 46. In this event, the recording head 54 first traverses the path 61 and records onto the horizontal recording section 16, and then, from a position 58, records onto the vertical section 18 as the film 10 traverses the recording head 54 along direction 46 (FIG. 1). Depending on the type of recording medium used for the recording region, the recording head 54 could be rotatably mounted, for example, to rotate at a position 58 (FIG. 4), which is the juncture between the recording strips 16, 18, to match the orientation of the respective recording strip.

For optimum efficiency, when using both recording sections 16, 18, the recording head 54 should preferably start from a position 60 and moved toward the position 58 where the recording head can be rotated and/or aligned with the vertical recording section 18.

Figure 2:
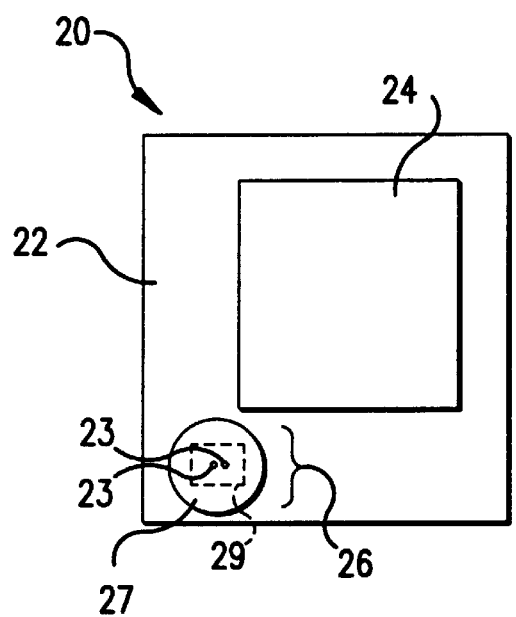
FIG. 2 illustrates a picture film according to a second embodiment of the present invention.

FIG. 2 illustrates a second embodiment of a picture film 20 that includes a frame 22 having a photographic section 24 for recording a visual image and a recording region 26 for recording a live or predetermined audio signal. The recording region 26 can include a chip 29 (shown in phantom) programmable to record an audio signal (e.g., when the frame is within the sleeve 71 and/or within the camera 52). The chip 29 can be activated to play a recorded message by depressing a button 27. In this respect, the camera 52 would not include a recording head 54, but the camera could be provided with structure, e.g., a hollow bore or passage from the outside of the camera leading to the frame of the film where the chip is located, and/or a device (such as, for example, the microphone 73 and/or an amplifier) to provide a recordable sound to the chip. For best results, the chip 29 should be clearly exposed to or in communication with the sound source to be recorded, and recording can commence, for example, by pressing a recording commencement button (e.g., button 76) that enables recording onto the chip. The chip 29 can be accessed with an electrical access device of the sleeve 71 and/or camera 52, which is in communication with the commencement button. For example, the chip can be accessed from the bottom side of the frame 22, or the top side of the frame 22 in which case the button 27 could be provided with ports 23 through which leads of the electrical access device can enter the ports 23 and communicate with the chip 29 when the commencement button is pressed. The chip 29 can be made programmable to accept a non-erasable message, if desired.

The recording region 26 of the frame 22 may be coupled to an external or an internal power source. If the power source is internal, the chip 29 may be coupled to a miniature battery (not shown) mounted on the frame 22, preferably close to the activation device or recording region. The chip 29 can also derive its recording power supply from a power source on the camera 52, such as the battery used to power the flash 66, in which case, for example, the battery may be located on the camera 52 or in the film sleeve 71. If the battery is provided on the frame itself, the battery can also be used to power a small sound producing device, such as, for example, a speaker (not shown) that could also be mounted on the frame 22.

If an internal power source is not used, (i.e., the battery for recording is mounted in the sleeve 71 or on the camera 52,) an external power source could be provided to play back the recorded message. One example of an external power source is shown in FIG. 3, which illustrates a photographic album 30 having frames 32 and 34 on opposite pages 36 and 38.

The frame 32 is of the type shown in FIG. 2 and includes a chip activation button 26 that can be provided with activation power from a plate member 35 adapted to cooperate with the chip using leads 37 provided with the page 36. The leads 37 are connected to respective ones of a plurality of access ports 31 of a power source 44 provided on the album 30. The plate member 35 may include prongs 39 that are adapted to access a recorded message on the chip.

Figure 3:
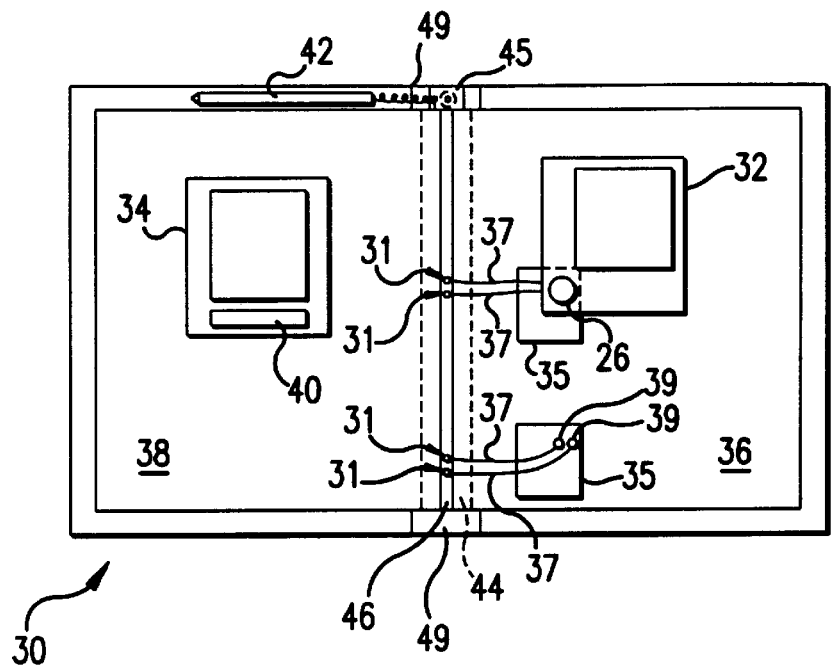
FIG. 3 illustrates a photographic album according to another embodiment of the present invention.

In FIG. 3, a page seam 46 is shown, which includes a space between the pages 36 and 38 so that the leads 37 can have easy access to the battery ports 31. One example of an album capable of creating a space between pages is a three-ring binder. However, even if the album pages are tightly bound, such as a book binding, the leads can be guided through the binding for connection to the access ports 31 of the power source 44. Furthermore, more than one plate member can be provided on each page, and the plate member 35 and leads 37 may be adjustably mounted on the page 36.

The frame 34 is of the type shown in FIG. 1, but includes only one recording horizontal recording strip 40, although the strip 40 could also be oriented vertically, depending on when audio recording begins in relation to visual recording. The audio strip 40 can be read using an electronic pen scanner 42 that may be clipped directly on the album 30 and powered by the power source 44, which may be mounted directly along the page and album seams 46 and 49, respectively.

The power source 44, the scanner 42 and/or the leads 37 of the plate member 35 may be linked to a speaker 45 for replaying the recorded message on the scanned recording strip or activated chip. The album 30 may include on each page various recesses, clips, glue, etc. to secure each frame in place on each page. Of course, other types of reading/scanning devices are within the scope of the present invention.

Figure 5:
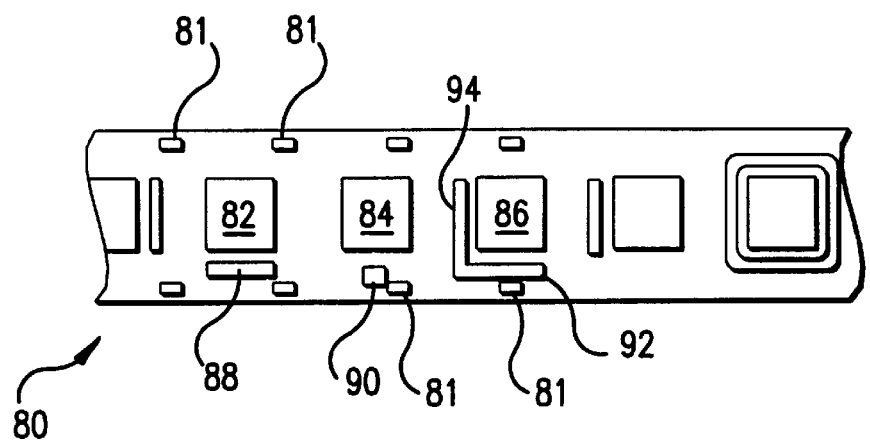
FIG. 5 illustrates a third embodiment of a film according to the present invention.

The present invention also encompasses providing an audio recording region of the type described above on conventional 24 or 36 exposure film rolls. As shown in FIG. 5, a portion of a film strip 80 includes perforations 81 and a plurality of frames 82, 84 and 86. The frame 82 includes a horizontal recording strip 88, the frame 84 includes a chip 90, and the frame 86 includes horizontal and vertical strips 92, 94. The winding spools (not shown) of the film cassette/camera could also be provided with structure to compensate for any film possibly having an unbalanced cross-section during (un)winding. With this embodiment, a message can be recorded well after the frame is exposed. In the developing stage, the recording sections can be transferred to the developed picture for selected playback. Alternatively, the developer can place recording regions that have no recording on the developed pictures, and a message can be recorded after the film is developed.

Figure 6:
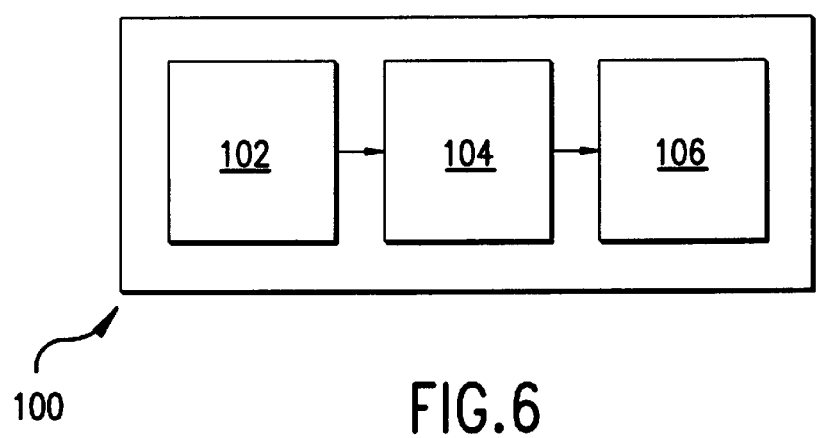
FIGS. 6 and 7 illustrate developing units for processing photographic film.
Figure 7:
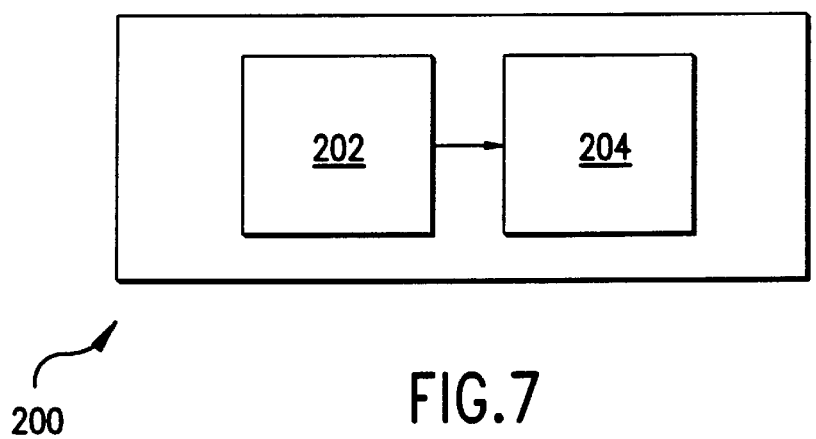

In addition, photographic developing units for processing these types of film strips is also within the scope of the present invention. One example of a developing unit 100 (FIG. 6) includes a film developing station 102, an extraction station 104 for removing the recording strip or chip from each film frame, and an insertion station 106 for forming the removed strip or chip on a corresponding developed picture. Another example of a developing unit 200 (FIG. 7) includes a film developing station 202 and an insertion station 204 for placing an unrecorded but recordable chip or strip on a margin of each developed picture.

Figure 8:
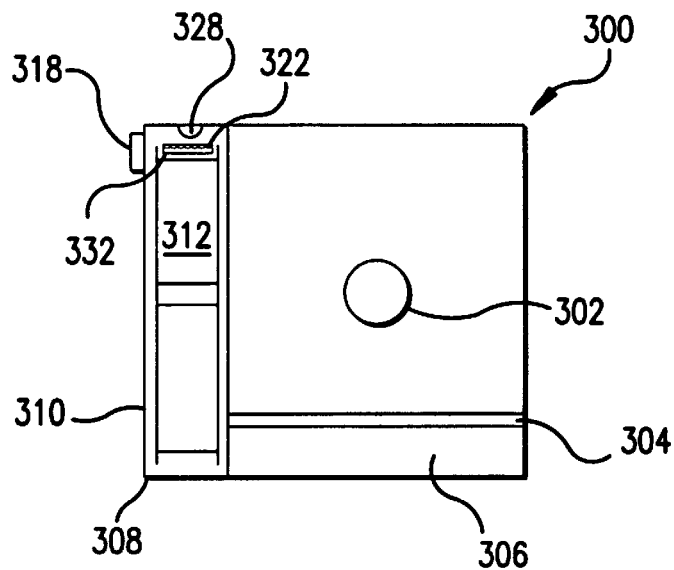
FIGS. 8–10 illustrate another embodiment of the invention.
Figure 9:
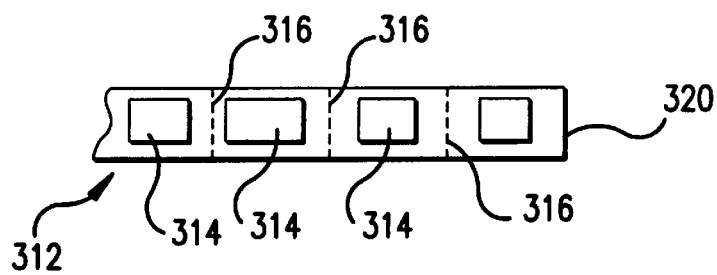
Figure 10:
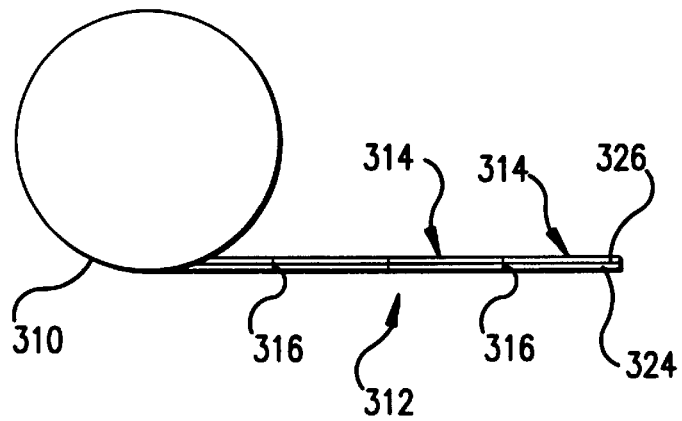

With reference to FIGS. 8–10, an embodiment of the invention is shown in which no modification of the film or camera is required. FIG. 8 shows a camera 300 which includes a lens 302 and a sleeve 306 that includes individual frames that exit from an exit slot 304 after exposure. FIG. 8 also shows a recording region supply, for example, a cartridge 308 that is adhered to or otherwise attached to the camera 300 and includes a reel or spool 310 having a wound strip 312. The cartridge could also be a stack-type dispenser which dispenses recorded chips individually.

As shown in FIG. 9, the strip 312 includes a plurality of recording regions 314 that are separated by perforations 316. The recording regions may be of the type shown in FIGS. 1 and 2, and/or the recording regions 314 may include miniature microphones, speakers and/or power supplies to constitute self-contained recording/playback devices.

In operation, recording commences (, e.g., before, after or during photographic exposure) when a commencement button 318 on the cartridge 308 is depressed, which causes a recording head or chip accessing element to record onto the recording region, as described above in conjunction with FIGS. 1 and 2. If a recording head is used, it may be stationary as the strip 312 passes the head, or the head may traverse the recording strip. If a chip accessing device is used, it need not be translatable. A microphone 328 can be provided to carry a recordable audio signal to a recording head or leads of a chip accessing device (not shown).

After the recording has finished, the first or lead recording region 320 is unwound to extend through an opening 332 of the cartridge 308, and is then torn across the perforation line 316, possibly with the assistance of teeth 322 positioned at the opening 332 of the cartridge 308. The next recording region of regions 314 is then aligned with the recording device, i.e., a recording head or chip accessing device. Once the first or lead recording region 320 has been removed from the remainder of the strip 312, a backing strip 324 (FIG. 10) is removed to expose an adhesive strip 326 that can be placed directly on an appropriate spot of the photographic frame (or some other surface). The recording region 320 can also be fixed to the frame or surface using other fixing devices. Of course, the commencement button can also be placed on the camera, and advancement of the spool 310 can be controlled in accordance with signals provided from the camera 300 based on movement of the photographic frame through the slot 304. Also, the spool 310 can be advanced manually and a recorded region can be produced on any number of selected photographic frames, if desired.

The invention has been described with reference to preferred embodiments thereof, which are intended to be illustrative, not limiting. Various modifications and changes can be made without departing from the spirit and scope of the invention as defined in the appended claims.

What is claimed is:

1. A camera comprising:
   a film exposure section including photographic film frames developable after each of the film frames exits from the film exposure section, each of said film frames having at least one audio recording region; and
   a recording device for recording an audio signal onto the at least one audio recording region of each of the film frames, wherein said at least one audio recording region includes first and second audio recording strips that are substantially perpendicular to one another, said first audio recording strip being recordable before the selected film frame exits the camera, and the second audio recording strip being recordable upon exiting of the selected film frame from the camera.

2. The camera according to claim 1, wherein the recording device comprises a recording head mounted for movement within the camera, said recording head traversing at least a selected one of the first audio recording strips prior to film exposure to record the audio signal on each selected one of the film frames.

3. The camera according to claim 1, further comprising an audio strip reader for reading at least one of the first and second audio recording strips for selected playback.

4. The camera according to claim 3, wherein the audio strip reader is selectively detachable from the camera.

5. The camera according to claim 1, wherein said photographic film is of the instantaneously developable type and transported along a first direction to exit the camera upon exposure, and said first audio recording strip is perpendicular to said first direction and said second audio recording strip is parallel to said first direction.

6. The camera according to claim 1, further comprising means for reproducing the audio signal.

7. The camera according to claim 1, wherein the at least one audio recording region includes a predetermined recorded message.

8. The camera according to claim 1, further comprising a cartridge connected to an exterior surface of the camera, wherein the cartridge includes a supply of recording regions, each of said recording regions having a backing that can be removed to expose an adhesive layer that supports the recording region, said adhesive layer being adhesively applied to a selected portion of a photographic frame.

9. The camera according to claim 1, wherein the recording head is mounted stationary with respect to the camera when the film exits the camera during recording.

10. The camera according to claim 1, wherein the recording device comprises a memory buffer for temporarily storing the audio signal, and a recording head for transferring the audio signal from the memory buffer to the second audio recording strip.

11. A system for recording a photographic image onto a photographic film and for selectively playing an audio message recorded adjacent the image of the photographic film, said photographic film being developable following commencement of an exposure operation, said system comprising:
    a plurality of photographic frames mounted within a sleeve, each of said frames including an exposure region developable to define the photographic image and at least one audio recording region adjacent the exposure region, each said at least one audio recording region having a chip mounted on the frame including a prerecorded audio message;
    a camera having a film exposure section containing said sleeve with said plurality of photographic frames, including each said at least one audio recording region with said prerecorded audio message; and
    an audio playback device cooperable with said audio recording region of each of said photographic frames.

12. The system according to claim 11, further comprising an audio playback device including a photographic album having a built-in speaker and a power source for selectively reproducing the audio signal of the at least one audio recording region of at least one of said film frames.

13. The system according to claim 11, wherein the prerecorded message is accessed from the chip by pressing a button mounted on the photographic frame, and said push button is provided with at least one access hole dimensioned to allow passage of a recording device of at least one of the camera and an external recording device for recording said message onto the chip.

14. The system according to claim 11, wherein each said prerecordedaudio message follows a common theme, and at least two of said audio messages are different from one another but still following said common theme.

15. The system according to claim 11, further comprising a recording device for recording said audio message onto the at least one audio recording region of at least a selected one of said photographic frames.

16. A sleeve containing a plurality of photographic film frames for use with a camera of the instantaneously developable type, said sleeve comprising:
    a container having an opening; and
    a predetermined number of stacked photographic frames housed within said container and structured to individually exit from the container after an exposure operation, each of said frames including:
       an exposure region developable to define a photographic image, and
       at least one audio recording region adjacent the exposure region, each said at least one audio recording region having a chip mounted on the frame and including a prerecorded audio message,
    wherein all of said prerecorded messages are recorded onto each of the photographic frames prior to the insertion of the container into the camera.

17. The sleeve according to claim 16, wherein each said prerecorded audio message follows a common theme, and at least two of said audio messages are different from one another but still following said common theme.

* * * * *